Patented Nov. 20, 1934

1,981,819

UNITED STATES PATENT OFFICE

1,981,819

INITIATING POLYMERIZATION REACTIONS

Peter J. Wiezevich, Elizabeth, and James M. Whiteley, Jr., Roselle, N. J., assignors to Standard Oil Development Company, a corporation of Delaware No Drawing. Application May 8, 1931, Serial No. 536,074

16 Claims. (Cl. 196—10)

This invention relates to the formation of liquid oily products from gaseous and light liquid olefines or from mixtures of olefines with liquid or gaseous hydrocarbons or other gases.

It has long been known that the lighter olefines such as ethylene, propylene, butylene and the like could be polymerized to liquid products by the suitable application of heat and elevated pressure. The application of these reactions to commercial processes has been largely prevented, however, both because of the difficulty of control of the reactions and on account of the severe conditions of temperature and pressure required. Means have now been found whereby these polymerizing or condensing reactions may be conducted more readily and under less severe pressure and temperature conditions than has been possible heretofore in treating the olefines alone.

This improved process is the subject of our invention, which will be fully understood from the following description.

The conditions for polymerizing olefines in the absence of catalysts indicate that a definite temperature-pressure relation exists, i. e., within certain limits with decreased temperature a considerable increase in pressure is required to cause polymerization, or with decreased pressures corresponding increases in temperature are required. For example, a pressure of about 2050 pounds per square inch is required for starting the polymerization of ethylene in a steel bomb at 345° C., while a decrease in temperature to 335° C. requires a pressure of 2760 pounds per square inch. It should be noted that these conditions are about the minimum for the reaction, and that higher temperatures are necessary at the same pressures in order to secure more rapid rates of reaction. For example, the optimum conditions for effecting the polymerization of ethylene in a steel bomb have been found to be at about 2760 pounds per square inch and 430° C. Somewhat more severe conditions are generally required for normal olefines of heavier molecular weight, or for mixtures of heavier olefines with ethylene, and still higher pressures are required when the olefines are mixed with diluent gases.

We have now found that the polymerization of olefines to liquid oily products may be caused to proceed smoothly and rapidly at much lower pressures and temperatures by the addition of a small amount of oxygen or other suitable oxidizing agent. The amount of oxygen added may vary within quite wide limits, but the required amount is generally less than that required to react with, or act as a dehydrogenating agent for, the reacting olefines. The addition of oxygen is necessary only to start the polymerization reaction and once started, the polymerization proceeds rapidly and smoothly at the same relatively mild conditions of temperature and pressure without further addition of oxygen. The reaction differs in this respect, as well as in the nature of the products and in other matters, from the well-known polymerization of heavy oils and asphalts by the addition of oxygen, where the reaction proceeds only during the period of time in which oxygen is added.

In our improved process oxygen may be mixed with the previously compressed and heated olefine. The optimum conditions of temperature and pressure at which the oxygen may be added depend to some extent on the type of apparatus, the method of operation, and the olefines used, and are best determined by experiment. It is generally preferable, especially in batch operation, to add the oxygen to the olefines preheated to a temperature between about 200 and 400° C., though other temperatures may be used. The initial pressure used may be suitably between 10 and 200 atmospheres or more as required, depending upon the temperature, and the pressure during the reaction may decrease even to atmospheric. Increased pressures above that necessary for polymerizing ethylene are desirable with increasing molecular weight of the olefines to give the same yield of liquid products. For example, under a temperature and other operating conditions at which a pressure of 60 atmospheres is suitable for polymerizing ethylene, 80 atmospheres is preferable for propylene and about 95 atmospheres for normal butylene.

The amount of oxygen added also depends upon the conditions of operation, but it has been found that the addition of large amounts has an adverse effect in causing the formation of carbon, water and large amounts of fixed gases, while the effect of the oxygen disappears altogether as the amount is decreased to very small values. In general, ratios of 0.01 to 0.4 mols of oxygen per mol of olefine are outside limits beyond which operation is unsatisfactory, and ratios between 0.03 and 0.2 are to be preferred. In some cases, as with pure olefines, it may be preferable to add closely regulated ratios of oxygen, and those from 0.07 to 0.12 have been found satisfactory, the greater ratios being preferred for ethylene and slightly lower ones for heavier olefines, such as propylene, butylene and heavier olefines. Pure oxygen, or air, or other mixtures of inert gases and oxygen, or compounds decomposing with liberation of oxygen, as hydrogen peroxide, may be used as desired.

The reaction may be conducted in the presence of contact surfaces such as broken fire brick or potsherds, silica, alumina, metal wool and the like, which may or may not possess individual catalytic properties for this process. Sulfur appears to exert an adverse inhibiting effect on the process, and it is preferable to substantially free the initial materials from sulfur compounds.

The degree of polymerization may be controlled within limits by the time of contact at the reaction conditions employed. In batch operation a fall in pressure occurs during the polymerization, and serves as a rough operating index of the extent of the polymerization. An extended period of time of 8 to 10 hours or more is desirable for fairly complete reaction for maximum yields and yields of about 60% of liquid oily products, based on the total olefines, or above 95% based on the reacting olefines, have been secured. Shorter periods may be used to obtain a product containing larger percentages of lighter fractions, at somewhat smaller yields. The lighter fractions boiling in the gasoline range are valuable as gasolines of good anti-detonating quality, and the heavier fractions may be cracked or destructively hydrogenated to increase the yield of the gasoline fraction. The gasoline fraction may also be dehydrogenated to yield gasolines of even better anti-detonating qualities, and both the original and the dehydrogenated products have many uses as solvents. The product, or especially the heavier fractions, which possess valuable lubricating characteristics, may be also further polymerized, or condensed with other hydrocarbon materials such as chlorparaffins, with the action of aluminum chloride, high frequency currents and other suitable means for the production of valuable lubricating oils, lubricants and similar products. In general, the hydrocarbon product resembles the known products of the low temperature polymerization of ethylene by other means, and may contain naphthenes, other cycloparaffins, aromatic hydrocarbons, heavy olefines, and the like.

The product also usually contains a small amount of oxygenated compounds, comprising among others acids, alcohols, aldehydes and ketones. The amount of these products depends upon the conditions used, the oxygen-olefine ratio, etc., and yields of from 10 to 20 per cent of compounds soluble in water and phosphoric acid have been secured using optimum conditions for the polymerization.

A small amount of gas consisting almost entirely of carbon monoxide, carbon dioxide and residual gaseous olefines is usually secured. The olefines may be recovered from the gas by suitable known means, such as refrigeration or absorption, and returned to the process.

While the polymerization process is preferably conducted as described above, it is understood that the process may also be conducted in either a continuous or semi-continuous manner.

The following example illustrates one method of operation of our process.

Ethylene is subjected to a pressure of 870 pounds per square inch at a temperature of 310° C. in a steel bomb. Air is then added at a constant rate during a period of about thirty minutes, so that the total volume of oxygen added is equal to one-tenth of the initial volume of ethylene. The bomb is maintained at the same temperature for a period of about eight hours and a final and maximum pressure for the run of 910 pounds per square inch results. The product is cooled and withdrawn and yields 10.9 gallons of oil per thousand cubic feet of ethylene reacting and 0.4 gallon of water.

The oil contains about 15 to 20 per cent of oxygenated compounds which are recovered with water and phosphoric acid, and an oil of the following characteristics is secured:

Specific gravity_____ 0.796
Per cent at 200° C_____ 50
Per cent at 300° C_____ 85

The process may be used in the polymerization of pure olefines or mixture of olefines with each other, or with other gases or in the direct polymerization of olefines from cracked gases or gases obtained from the destructive distillation of oils. Gases containing large amounts of olefines and suitable for use in our process may be obtained by passing vaporized petroleum fractions or gaseous hydrocarbons through a heated tube at low pressures and relatively high temperatures sufficient to cause extensive thermal decomposition. The cracked gases resulting may be used as secured, or the olefines and other hydrocarbons may be separated therefrom, and this mixture forms a desirable initial material for our process.

This invention is not to be limited to any illustrative examples, nor method of operation, nor to any theory of the reactions involved, but only to the following claims in which we wish to claim all novelty.

We claim:

1. The method of polymerizing gaseous and light liquid materials containing large amounts of olefines, comprising preheating the olefine-containing material and then adding a quantity of gaseous oxidizing agent insufficient to react with the total olefines entering the polymerization reaction.

2. In the polymerization of gaseous and light liquid materials containing large amounts of olefines by the action of heat and elevated pressure, an improved method of initiating the reaction comprising adding to the previously heated olefine material a quantity of gaseous oxidizing agent insufficient to react with the total olefines.

3. An improved method for the production of liquid oily products from gaseous and light liquid olefines comprising subjecting the olefines to an elevated temperature and pressure insufficient to initiate polymerization, and adding a quantity of gaseous oxidizing agent insufficient to react with the total olefines.

4. An improved method for initiating the polymerization of gaseous and light liquid olefines comprising subjecting the olefines to conditions of temperature between 200 and 400° C. and pressure between 10 and 200 atmospheres insufficient to initiate polymerization, and adding a quantity of gaseous oxidizing agent insufficient to react with the total olefines.

5. An improved method for the formation of liquid oily products from gaseous and light liquid olefines comprising subjecting the olefine to a temperature between the approximate limits of 200 and 400° C. and pressure between the approximate limits of 10 and 200 atmospheres, insufficient to initiate polymerization, adding 0.03 to 0.2 volumes of oxygen per volume of olefine, maintaining the mixture at substantially the same conditions of temperature and pressure for an extended period of about 5 to 10 hours, and withdrawing and cooling the product.

6. An improved method for the formation of liquid oily products from ethylene comprising subjecting the olefine to a temperature of about 310° C. and a pressure of about 870 pounds per square inch, slowly adding air thereto to introduce 0.03 to 0.2 volumes of oxygen per volume of ethylene, maintaining the mixture at substantially the same conditions of temperature without release of pressure for an extended period of about 5 to 10 hours, and withdrawing and cooling the product.

7. Process according to claim 3 in which the product is washed with water and phosphoric acid in order to recover the oxygenated compounds produced as a by-product of the polymerization reaction, and an oily residue is produced.

8. Process according to claim 3 in which the olefine comprises ethylene.

9. Process according to claim 3 in which the olefine comprises propylene.

10. Process according to claim 3 in which the olefine comprises butylene.

11. Process according to claim 3 in which the product containing oxygenated compounds is distilled to produce a fraction suitable for gasoline.

12. Process according to claim 3 in which the product is freed from oxygenated compounds and then distilled to produce a fraction suitable for gasoline.

13. The method of making polymerization products comprising first polymerizing gaseous and light liquid materials containing large amounts of olefines in the presence of an amount of oxygen insufficient to react with the total olefines to produce a liquid oily product and then subsequently submitting this product to a further polymerization.

14. The method of making polymerization products comprising first polymerizing gaseous and light liquid materials containing large amounts of olefines in the presence of an amount of oxygen insufficient to react with the total olefines to produce a liquid oily product and then subsequently submitting this product to a further condensation with other hydrocarbon materials.

15. Method of making a motor fuel comprising first polymerizing gaseous and light liquid materials containing large amounts of olefines in the presence of an amount of oxygen insufficient to react with the total olefines, distilling the product to produce a lighter fraction suitable for motor fuel and a heavier fraction, cracking this heavier fraction to produce additional motor fuel and adding this additional motor fuel to the lighter fraction already obtained.

16. An improved method for the production of liquid oily products from gaseous and light liquid olefines, comprising subjecting the olefines to predetermined conditions of elevated temperature and pressure insufficient to initiate polymerization, adding 0.03 to 0.2 volumes of oxygen per volume of olefine, and maintaining the mixture substantially at said predetermined conditions of temperature and pressure for a sufficient length of time to effect substantial polymerization of said olefines.

PETER J. WIEZEVICH.
JAMES M. WHITELEY, Jr.